(12) United States Patent
LeCrone et al.

(10) Patent No.: US 6,308,284 B1
(45) Date of Patent: Oct. 23, 2001

(54) METHOD AND APPARATUS FOR MAINTAINING DATA COHERENCY

(75) Inventors: Douglas E. LeCrone, Foxborough; Yuval Ofek, Framingham; Daniel A. Murphy, Hopkinton, all of MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/143,698

(22) Filed: Aug. 28, 1998

(51) Int. Cl.[7] .................................................. G06F 11/00
(52) U.S. Cl. ....................................................... 714/6; 714/3
(58) Field of Search ........................... 714/3, 6; 707/201, 707/202, 203

(56) References Cited

U.S. PATENT DOCUMENTS

| | | | |
|---|---|---|---|
| 5,206,939 | 4/1993 | Yanai et al. | 395/400 |
| 5,212,784 | 5/1993 | Sparks | 395/575 |
| 5,241,668 | 8/1993 | Eastridge et al. | 395/575 |
| 5,241,670 | 8/1993 | Eastridge et al. | 395/575 |
| 5,394,554 | 2/1995 | Elko et al. | 395/800 |
| 5,544,347 | 8/1996 | Yanai et al. | 395/489 |
| 5,555,371 | 9/1996 | Duyanovich et al. | 395/182.11 |
| 5,592,618 | 1/1997 | Micka et al. | 395/185.07 |
| 5,615,329 * | 3/1997 | Kern | 714/6 |
| 5,649,152 | 7/1997 | Ohran et al. | 395/441 |
| 5,680,580 | 10/1997 | Beardsley et al. | 395/489 |
| 5,692,155 * | 11/1997 | Iskiyan | 711/162 |
| 5,720,029 | 2/1998 | Kern et al. | 395/182.18 |
| 5,734,818 | 3/1998 | Kern et al. | 395/182.18 |
| 5,742,792 | 4/1998 | Yanai et al. | 395/489 |
| 5,870,537 * | 2/1999 | Kern | 714/6 |
| 6,088,815 * | 7/2000 | West | 714/15 |

* cited by examiner

Primary Examiner—Robert Beausoleil
Assistant Examiner—Bryce P. Bonzo
(74) Attorney, Agent, or Firm—George A. Herbster

(57) ABSTRACT

A method and apparatus for assuring data consistency in a data processing network including local and remote data storage controllers interconnected by independent communication paths. The remote storage controller or controllers normally act as a mirror for the local storage controller or controllers. If, for any reason, transfers over one of the independent communication paths is interrupted, transfers over all the independent communication paths to predefined devices in a group are suspended thereby assuring the consistency of the data at the remote storage controller or controllers. When the cause of the interruption has been corrected, the local storage controllers are able to transfer data modified since the suspension occurred to their corresponding remote storage controllers thereby to reestablish synchronism and consistency for the entire dataset.

20 Claims, 11 Drawing Sheets

METHOD AND APPARATUS FOR MAINTAINING DATA COHERENCY

BACKGROUND OF THE INVENTION

1. Field of the Invention

This invention generally relates to the storage of data for use in data processing systems. More particularly, this invention relates to maintaining data integrity and consistency in redundant storage systems.

2. Description of Related Art

Nearly all data processing system users are concerned with maintaining back-up data in order to insure continued data processing operations should their data become lost, damaged or otherwise unusable. Such back-up operations can be achieved through a variety of procedures. In one approach, copies of data on a primary storage device are made on the same or other media such as magnetic tape to provide an historical backup. Typically, however, these systems require all other operations in the data processing system to terminate while the backup is underway.

More recently disk redundancy has evolved as an alternative or complement to historical tape backups. Generally a redundant system uses two or more disk storage devices to store data in a form that enables the data to be recovered if one disk storage device becomes disabled. For example, a first disk storage device stores the data and a second disk storage device mirrors that data. Whenever a transfer is made to the first disk storage device, the data also transfers to the second disk storage device. Typically separate controllers and paths interconnect the two disk storage devices to the remainder of the computer system. One advantage of this type of system is that the redundant copy is made without interrupting normal operations.

Several systems have been proposed for providing concurrent backups to provide the advantage of a tape backup without interrupting normal operations. For example, U.S. Pat. No. 5,212,784 to Sparks discloses an automated concurrent data backup system in which a central processing unit (CPU) transfers data to and from storage devices through a primary controller. The primary controller connects through first and second independent buses to first and second mirrored storage devices respectively (i.e., a primary, or mirrored, storage device and a secondary, or mirroring, storage device). A backup controller and device connect to one or more secondary storage devices through its bus. Normally the primary controller writes data to the primary and secondary data storage devices. The CPU initiates a backup through the primary controller. In response the backup controller takes control of the second bus and transfers data from one secondary data storage device to the backup media. Applications continue to update the primary and any additional secondary storage devices. After a backup operation is completed, the primary controller resynchronizes the storage devices by updating the secondary storage device that acted as a source for the backup with any changes that occurred to the primary data storage device while the backup operation was underway.

U.S. Pat. Nos. 5,241,668 and 5,241,670 to Eastridge et al. disclose different aspects of concurrent backup procedures. In accordance with these references a request for a backup copy designates a portion of the stored data called a "dataset". For example, if the data storage devices contain a plurality of discrete data bases, a dataset could include files associated with one such data base. In a normal operation, the application is suspended to allow the generation of an address concordance for the designated datasets. Execution of the application then resumes. A resource manager manages all input and output functions between the storage sub-systems and associated memory and temporary memory. The backup copy forms on a scheduled and opportunistic basis by copying the designated datasets from the storage sub-systems and updating the address concordance in response to the copying. Application updates are processed during formation of the backup copy by buffering the updates, copying the effected uncopied designated datasets to a storage sub-system memory, updating the address concordance in response to the copying, and processing the updates. The designated datasets can also be copied to the temporary storage memory if the number of designated datasets exceeds some threshold. The designated datasets are also copied to an alternate memory from the storage sub-system, storage sub-system memory and temporary host memory utilizing the resource manager and the altered address concordance to create a specified order backup copy of the designated datasets from the copied portions of the designated datasets without user intervention.

Still referring to the Eastridge et al. patents, if an abnormal event occurs requiring termination of the backup, a status indication is entered into activity tables associated with the plurality of storage sub-systems and devices in response to the initiation of the backup session. If an external condition exists that requires the backup to be interrupted, the backup copy session terminates and indications within the activity tables are reviewed to determine the status of the backup if a reset notification is raised by a storage sub-system. This enables the determination of track extents which are active for a volume associated with a particular session. A comparison is then made between the track events which are active and volume and track extents information associated with a physical session identification. If a match exists between the track extents which are active and the volume of and track extent information associated with a physical session identification, the backup session resumes. If the match does not exist, the backup terminates.

U.S. Pat. No. 5,473,776 to Nosaki et al. discloses a concurrent backup operation in a computer system having a central processing unit and a multiple memory constituted by a plurality of memory devices for on-line storage of data processed by tasks of the central processing unit. A data backup memory is provided for saving data of the multiple memory. The central processing unit performs parallel processing of user tasks and a maintenance task. The user tasks include those that write currently processed data into the multiple memory. The maintenance task stops any updating of memory devices as a part of the multiple memory and saves the data to a data backup memory.

More recently the concept of redundancy has come to include geographically remote data facilities. As described in U.S. Pat. No. 5,544,347 to Yanai et al. for Remote Data Mirroring and U.S. Pat. No. 5,742,792 to Yanai et al. for Remote Data Mirroring (both assigned to the assignee of this invention), a computer system includes one or more local and one or more remote data facilities. Each local and remote data facility typically includes a data processing system with disk storage. A communications path, that may comprise one or more individual communications links, interconnects a local storages facility with a remote storage facility that is a mirror for the local storage facility. The physical separation can be measured in any range between meters and hundreds or even thousands of kilometers. In whatever form, the remote data facility provides data integrity with respect to any system errors produced by power failures, equipment failures and the like.

In prior art systems one dataset normally is stored in a single storage facility, so data consistency has been achieved whenever the remote storage facility exactly mirrors the local storage facility; i.e, the two facilities are in synchronism. Generally if a communications path comprising one or more communications links, fails (i.e., no data can be transferred over any of the communications links), the dataset remains in the remote storage facility, but no longer is updated. This becomes particularly important when data must be recovered because without consistency or synchronism data in a dataset that has not yet reached the remote or backup facility may be lost.

U.S. Pat. No. 5,720,029 to Kern et al. discloses one approach for providing a disaster recover system that utilizes a synchronous remote data shadowing to obtain a backup copy of data. A host processor at the primary, or local, site transfers a sequentially consistent order of copies of record updates to the secondary site for backup purposes. The copied record updates are stored on the secondary storage devices at the remote site that form remote copy pairs with the primary data storage devices. One track array, as an active track array, is used to set elements according to which tracks on the primary storage device receive record updates from the host processor at the primary site. The other track array, as a recovery track array, designates which record updates comprise the copy record updates currently transferred from the primary site to the secondary site for data shadowing and is used for recovery should an error interrupt the transfer. The track arrays are toggled once the consistency group transfer completes and a recovery track array becomes the active track array and the active track array becomes the recovery track array.

U.S. Pat. No. 5,649,152 to Ohran et al. discloses another method and system for providing a static snapshot of data stored on a mass storage system. In accordance with this approach a preservation memory is provided and a virtual device is created in that preservation memory. Whenever a write operation is to be performed on the mass storage system, a check is made of the preservation memory to determine if it contains a block associated with the mass storage write device. If no block is present, a copy of the block in the mass storage system at the block write address is placed in the preservation memory. Whenever a read is to be performed on the virtual device, a check is made of the preservation memory to determine if it contains a block associated with the virtual device read address. If a block exists, that block is returned in response to the read operation. Otherwise, a block at the virtual device block read address is returned from the mass storage device.

U.S. Pat. No. 5,680,580 to Beardsely et al. discloses a remote copy system that incorporates dynamically modifiable ports on storage controllers such that those ports can operate either as a control unit link-level facility or as a channel link-level facility. When configured as a channel link-level facility, a primary storage controller to can appear as a host processor to a secondary storage controller. The primary storage controller can thereafter initiate multiple request connects concurrently for servicing a single I/O request. In this manner, a first available path can be selected and system throughput is improved. In this system host write commands at the primary storage controller are intercepted for a remote dual copy process. As a result of the intercept, the system determines whether a unit check write I/O flag is set. If it is not set, data is written to the primary cache or MVS and thereafter to the primary device. Once the data is stored at the primary storage controller, a connection is established to the secondary storage controller to allow a remote copy to proceed to transmit the data to the secondary storage controller.

Each of the foregoing references describes a different method of obtaining a backup and particularly addresses data consistency as between a specific storage controller and its backup facility whether that facility comprises a magnetic disk or tape device. The broad or basic object of these patents, particularly the Ohran et al. and Kern et al. patents, is to provide a method of tracking any changes that are in transit so that a disaster recovery will identify those items that need to be recovered.

Now storage facilities using redundancy including remote data facilities have become repositories for large databases. Recently, these databases and other types of datasets have grown to such a size that they are distributed across multiple independent storage controllers or facilities. This has a led to a new definition of data consistency. In the following description we use "synchronism" in a conventional context and "consistency" in a modified context to account for such distributed datasets. As between a single storage controller and a single backup facility, such as disclosed in the foregoing Yanai et al. patents, the storage devices are in synchronism when the data at the local site corresponds exactly to the data on a secondary storage facility coupled by a single communications path. When multiple independent communications paths are involved with the transfer of data in different portions of a dataset, such as the journal log file and the data base, and the transfer of data over one path is interrupted, the remote storage facility associated with that communications path loses synchronism. In addition, even though other remote sites may remain in synchronism, the data across the remote storage facilities storing the dataset will no longer be consistent. If this occurs, the remotely stored dataset becomes corrupted. Conversely, if data transfers can occur over all the communications paths associated with a dataset and all the corresponding remote storage facilities are in synchronism with their local storage facility counterparts, the dataset is consistent. Consequently, what is needed is a method and apparatus for enabling a user to be assured that the data at the remote data facilities in such multiple communications path configurations is consistent, even when data can not be transferred across one or more communications paths.

SUMMARY

Therefore it is an object of this invention to provide a method and apparatus for assuring consistency of data at one or more remote sites coupled to one or more local sites by multiple communications paths.

Another object of this invention is to provide such data consistency at a remote site transparently to any user application.

Still another object of this invention is to provide such data consistency to a remote site with minimal impact on other data processing operations.

In accordance with this invention, a host interacts with a first dataset copy. Transfers to a second dataset copy occur over multiple independent communications paths. If a transfer over one of the independent communications paths is not efficacious, all transfers from the first to the second dataset copy over all the independent paths are terminated. However, operations between the host and the first dataset copy continue. When the cause of the transfer interruption is corrected, transfers to the second dataset copy over all the independent communications paths resume.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
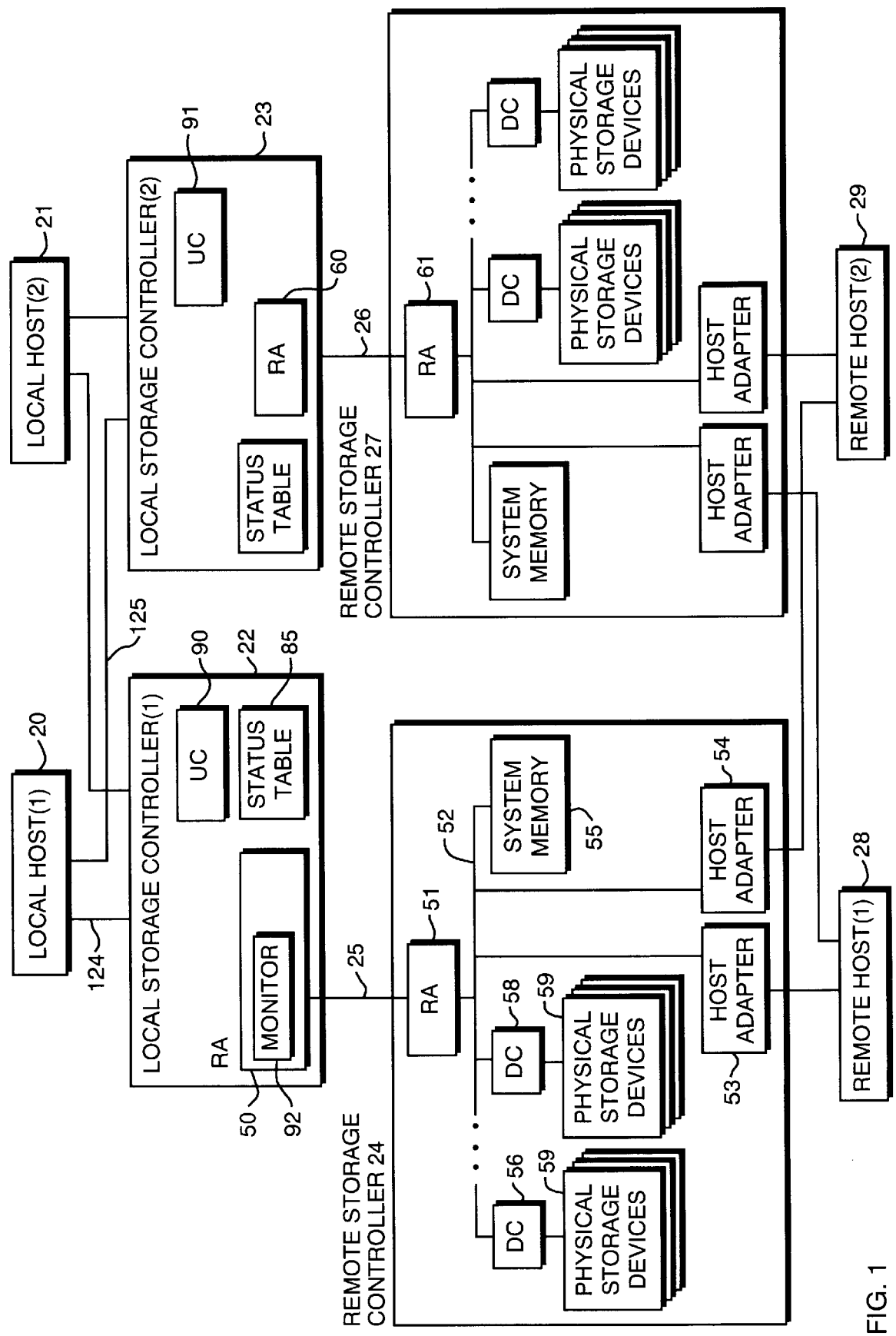
FIG. 1. is a block diagram of a data processing system adapted for benefitting from this invention.

There are many possible examples of data processing system configurations adapted for providing data redundancy within the context of this invention. FIG. 1 depicts one such configuration in which local hosts 20 and 21 connect to local storage controllers systems or controllers 22 and 23. All transactions required by the local hosts 20 and 21 are then carried out with the local storage controllers 22 and 23. In this particular embodiment a remote storage controller 24 connects to the local storage controller 22 over a communications path 25 that, as previously described, may contain multiple communications links. The structure of the local storage controller 22, remote storage controller 24 and communications path 25 are as depicted in the magnetic disk storage systems of U.S. Pat. No. 5,742,792. In essence the remote storage controller 24 maintains a copy of some or all of the data stored in the local storage controller 22. The controllers 22 and 24 normally operate to maintain the remote storage controller 24 in synchronism with the local storage controller 22.

A communications path 26, like the communications path 25, connects the local storage controller 23 to a remote storage controller 27. In accordance with the prior discussion, the remote storage controller 27 acts as a mirror for some or all of the data in the local storage controller 23.

With this configuration remote hosts 28 and 29 are connected to communicate with both remote storage controllers 24 and 27. As the communications paths 25 and 26 can extend for many miles a disaster at the local facility will not interrupt operations at the remote facility whereupon the remote hosts 28 and 29 interact with the data in the remote storage controllers 24 and 27.

As previously indicated, it now is possible for all the data in a single dataset, such as a dataset in the form of a database, to be so large as to be stored in a plurality of local storage controllers. Alternatively it is possible for such a dataset to be stored in a single local storage controller and mirrored in multiple remote storage controllers. In whatever form, in such systems redundancy is achieved with one or more remote storage controllers are connected to one or more local storage controllers through plural independent communications paths. These paths are subject to failure or interruption for any number of reasons including failures of third-party communications systems, failure of some portion of a remote storage controller or related electronics or even removal of an individual storage device from a remote storage controller.

With prior art embodiments, if communications over one path are interrupted, such as the path 26, communications will continue with the remote storage controller 24 over the communications path 25. Consequently, the remote storage controller 24 will remain in synchronism with the local storage controller 22, but the remote storage controller 27 will lose synchronism with the local storage controller 23. Consequently the data for the entire dataset will be inconsistent.

Figure 2:
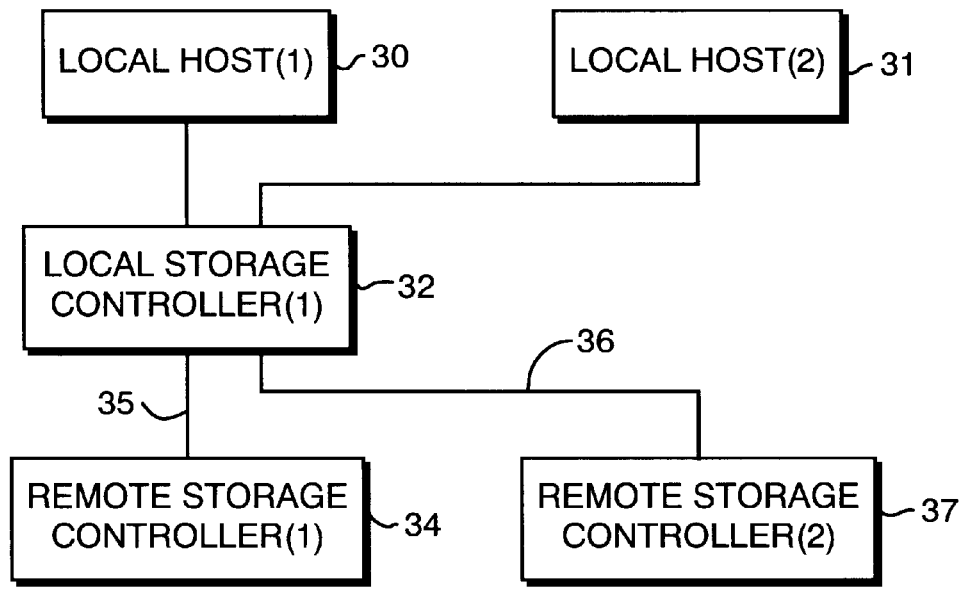
FIG. 2 depicts an alternative embodiment of a data processing system that can benefit from this invention.

FIG. 2 depicts in block form another configuration wherein two remote storage controllers mirror a dataset contained in a single local storage controller. More specifically, local hosts 30 and 31 connect to a local storage controller 32. A remote storage controller 34 mirrors a portion of the dataset in the local storage controller 32, such as a journal log file in a database application, over a communications path 35; a second communications path 36 enables a remote storage controller 37 to mirror the other portion of the dataset in the local storage controller 32, such as the database. In this configuration and with an interruption in the communications path 35, the remote storage controller 37 continues to operate and mirror the corresponding dataset portion while the data in the remote storage controller 34 remains frozen at a point earlier in time. The database distributed over the remote storage controllers 34 and 37 site therefore no longer is consistent after a first write to the remote storage controller 34 fails to be completed.

Figure 3:
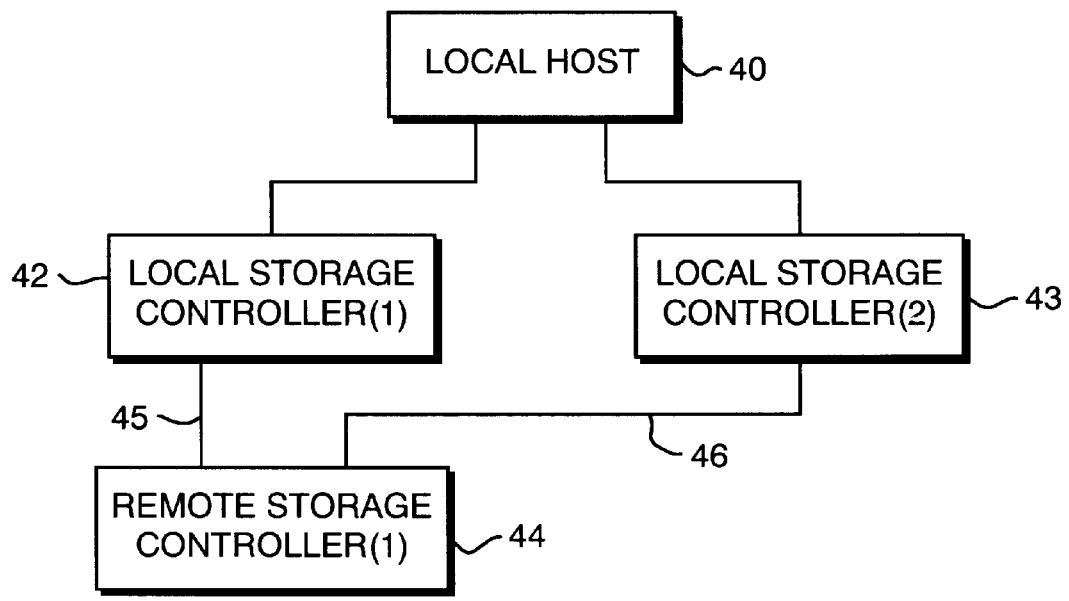
FIG. 3 depicts another alternative embodiment of a data processing system that can benefit from this invention.

FIG. 3 depicts another embodiment in which a single remote storage controller mirrors a dataset distributed over two local storage controllers. More specifically, a local host 40 has access to the dataset distributed over a local storage controller 42 and local storage controller 43. A remote storage controller 44 has two independent communications paths 45 and 46 for allowing the remote storage controller 44 to mirror the dataset portions in the local storage controllers 42 and 43, respectively. If transfers over the communications path 46 are interrupted, only those changes made to portions of the dataset in the local storage controller 42 will be reflected in the remote storage controller 44. Again, the copy of the dataset in the remote storage controller 44 will not be consistent.

In general terms, this invention prevents such inconsistency automatically and transparently to any user. Each local storage controller monitors the ability of a communications path and remote storage controller to update data. If the monitoring indicates such updates are not possible, a special error signal is generated. The operating system in the local host, modified in accordance with this invention, processes that special error signal by suspending all further transfers over all the independent communications paths related to the dataset until the problem is corrected. When this occurs, all synchronism is lost between individual pairs of local and remote storage controllers. However, as the dataset copy at the remote site remains in a fixed consistent state so that the dataset remains usable.

For purposes of a further and more detailed understanding of this invention, FIG. 1 depicts a particular embodiment of a data facility incorporating magnetic disk storage controllers of a type provided by the assignee of this invention and described in the foregoing Yanai et al. patents. The communications path 25 includes electronic transmission media that may include any known high-speed data communications link such as a link provided by fiber optics, T1 and T3 telecommunications links and the like. A remote adapter (RA) 50 resides in the local storage controller 22 and a corresponding RA 51 resides in the remote storage controller 24 to control all the links in a specific communications path.

Referring to the remote storage controller 24, the RA 51 connects to a bus 52 that communicates with host adapters 53 and 54 connected to remote hosts 28 and 29 respectively. A system memory 55, commonly called a cache memory, also connects to the bus 52. Data storage is provided by a device controller (DC) 56 that connects to one or more physical storage devices 57. Another device controller 58 attaches to a plurality of physical storage devices 59. During normal operation the remote storage controller 24 mirrors the local storage controller 22 as known in the art and described in the above-identified Yanai et al. patents. A further understanding of the operation details can be attained by referring to these references.

As also shown in FIG. 1, the local storage controller 23 includes a remote adapter 60 that communicates over the communications path 26 with a remote adapter 61 in the remote storage controller 27. These controllers are similar to the storage controllers 22 and 24 so no additional discussion of their structures is necessary.

Figure 4:
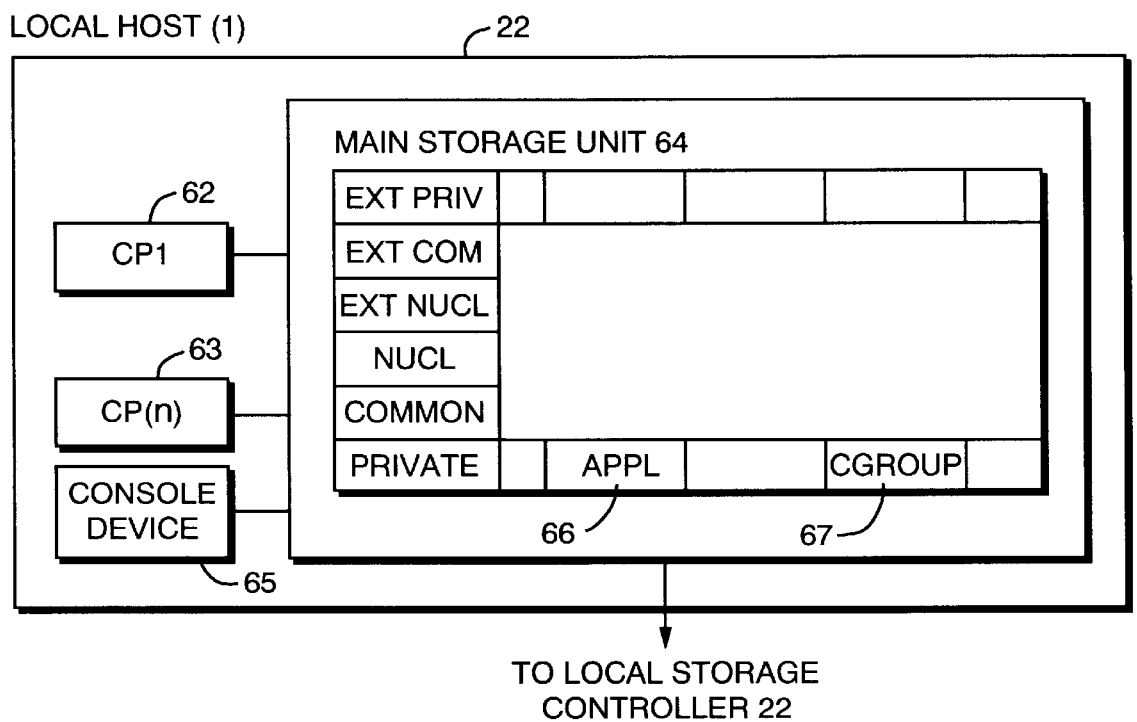
FIG. 4 depicts the organization of a local host as shown in any of FIGS. 1 through 3.

The hosts shown in FIG. 1 operate utilizing some commercially-available operating system, such as the IBM MVS operating system. The local host 20 in such an MVS environment includes a plurality of CPs. FIG. 4 depicts two control processors CP(1) and CP(n) identified by reference numerals 62 and 63, respectively, by way of example. They communicate with a main storage unit 64 that, as known, is divided into private, common, and extended private storage areas. A console device 65 permits an operator to communicate with the system for performing a number of configuration, diagnostic and other procedures independently of operations that occur in response to any application programs.

Figure 5:
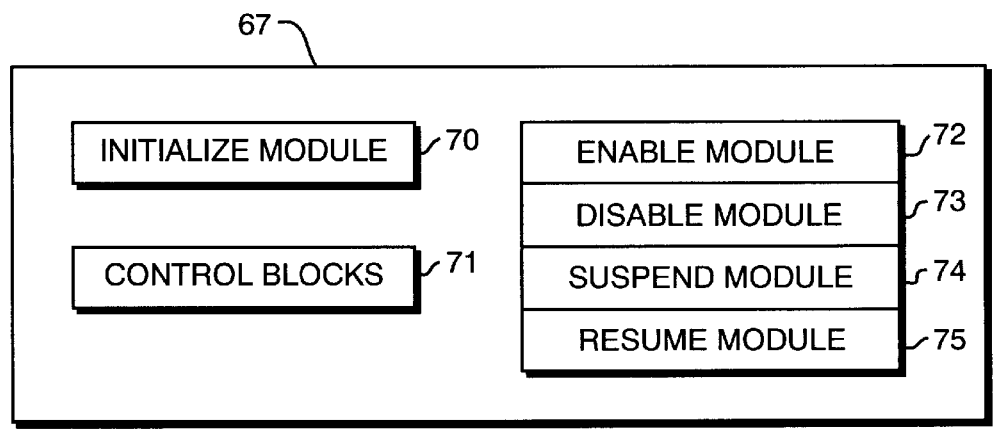
FIG. 5 depicts a particular data structure that is useful in implementing this invention.

When any application program is loaded into the system, the MVS operating system provides an address space for that program. FIG. 4 depicts an address space 66 for a user application (APPL) program and an address space 67 assigned for a consistency group program that incorporates this invention. As shown in FIG. 5 the CGROUP address space 67 in storage unit 64 includes an INITIALIZE module 70 that establishes various data structures and loads the remaining program into the system. The INITIALIZE module also modifies the MVS system to route responses to particular events to software included in the consistency group program 67. Control blocks 71 contain information about the physical storage devices (hereinafter devices) that are organized into a consistency group and related status information. The functional modules of this system include an ENABLE module 72 that enables the local controller to monitor each writing operation. A DISABLE module 73 terminates the monitoring operation. When transfers over a communications path are interrupted for any reason, a SUSPEND module 74 suspends further transfers to all the devices in the consistency group. After corrections are made, a RESUME module 75 enables the remote storage controllers to be brought into synchronism and for the testing for consistency to resume.

Figure 6:
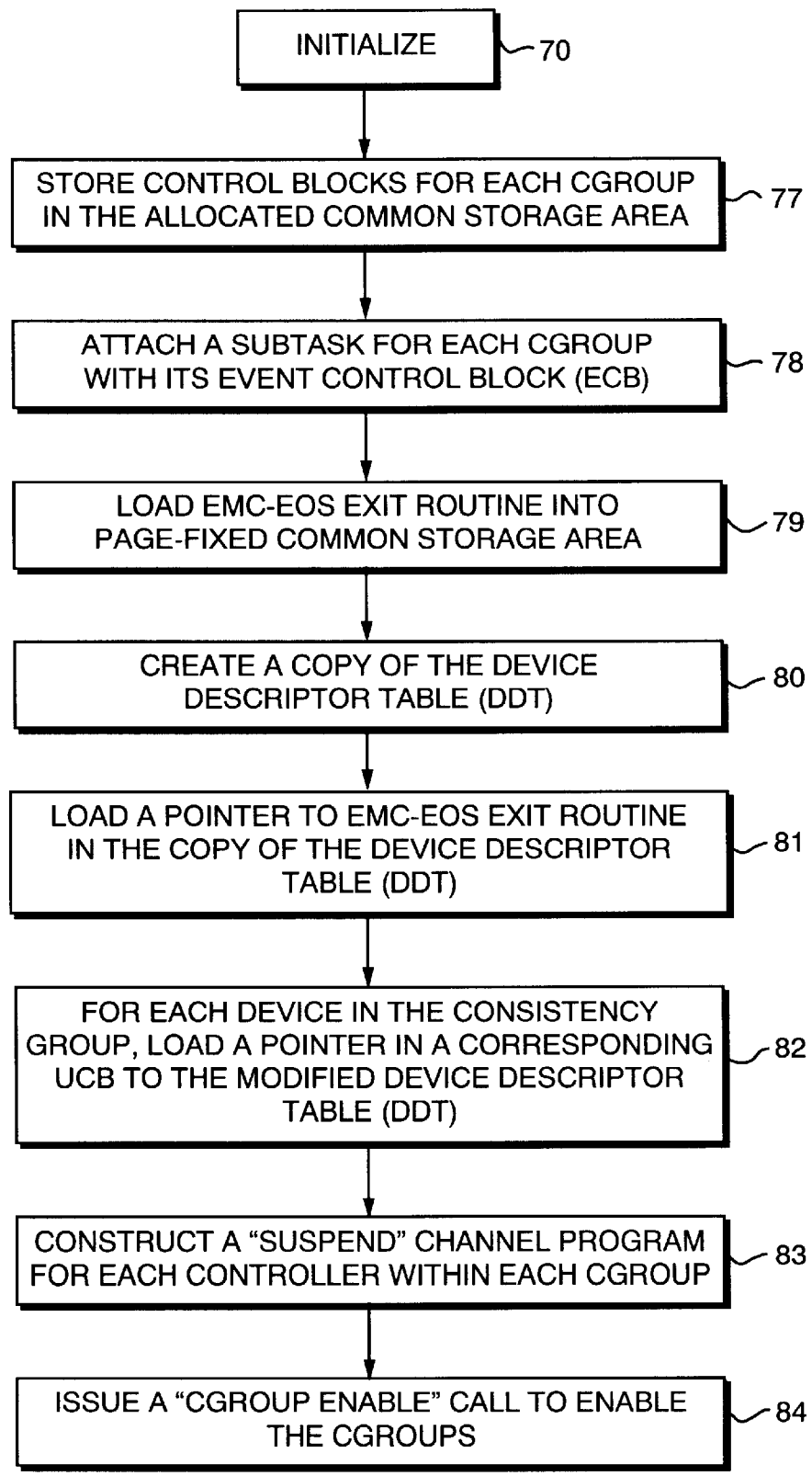
FIG. 6 depicts an embodiment of an initialize module useful in implementing this invention.
Figure 7:
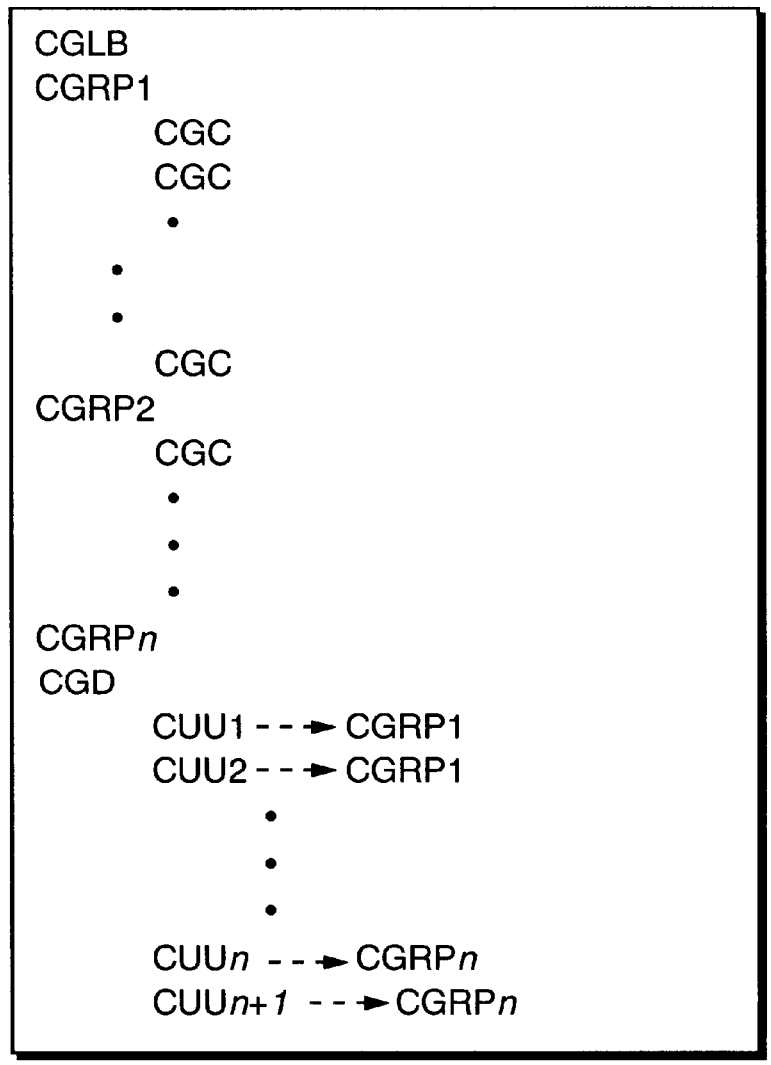
FIG. 7 depicts an embodiment of control blocks useful in accordance with the embodiment of FIG. 5.

FIG. 6 depicts the INITIALIZE module 70 in more detail. This module is processed after the consistency group program is loaded in the address space. As a first operation, step 77 stores a control block, such as control block 71, for each such consistency group in the allocated common storage area. As shown in FIG. 7, control blocks 71 are stored in a table having an initial location designated by a specific subsystem control block (SSCT). With respect to FIG. 7, the SSCT for the consistency group contains a-pointer (SSCT 'CGRP') to the control blocks 71. The CGLB contents provides a header function. The next location includes the name of one consistency group. In this particular embodiment it is identified as a CGRP1 consistency group. The CGLB location contains a pointer to the CGRP1 location as first location. The CGRP1 location, in turn, contains a first pointer to the next consistency group name; in this particular embodiment that is the location for the CGRP2 consistency group. The CGRP1 location also references a second pointer to a CGC entry that represents one local controller within the CGROUP. Thus, if one consistency group includes a dataset distributed over the local storage controllers 22 and 23, the CGC entries identify the local controllers 22 and 23. The CGC entry also contains a pointer to the next CGC entry with the last entry being a pointer to a null location that acts as an end-of-list code.

Control blocks 71 also includes a CGD area that is an index of all devices in all consistency groups sorted in device (CUU) order. Each location has a pointer to its corresponding consistency group.

Once this control block data 71 has been produced, step 78 attaches a subtask for each consistency group with each subtask waiting on an event control block (ECB). The process of attaching subtasks is a standard procedure implemented in the MVS operating system.

Normally the MVS operating system includes an EOS exit routine for responding to particular events. In accordance with this invention, step 79 loads an EMC-EOS exit routine into a page fixed storage area. Step 80 then creates a copy of the standard device descriptor table (DDT) provided in the MVS operating system. Step 81 modifies that copy by replacing a pointer to the standard EOS exit routine or procedure by a pointer to the EMC-EOS exit routine. For each device in the consistency group, step 82 loads a pointer in a corresponding UCB to the modified data descriptor table.

Next the INITIALIZE module uses step 83 to construct a "suspend" channel program for each controller within each consistency group. That is, if a consistency group spans n controllers, step 83 will generate n suspend channel programs. When a suspend channel program runs, it will identify each device of the corresponding controller within the corresponding consistency group.

When this action is completed, step 84 issues a "CGROUP ENABLE" call to enable all the listed consistency groups in step 84.

Figure 8:
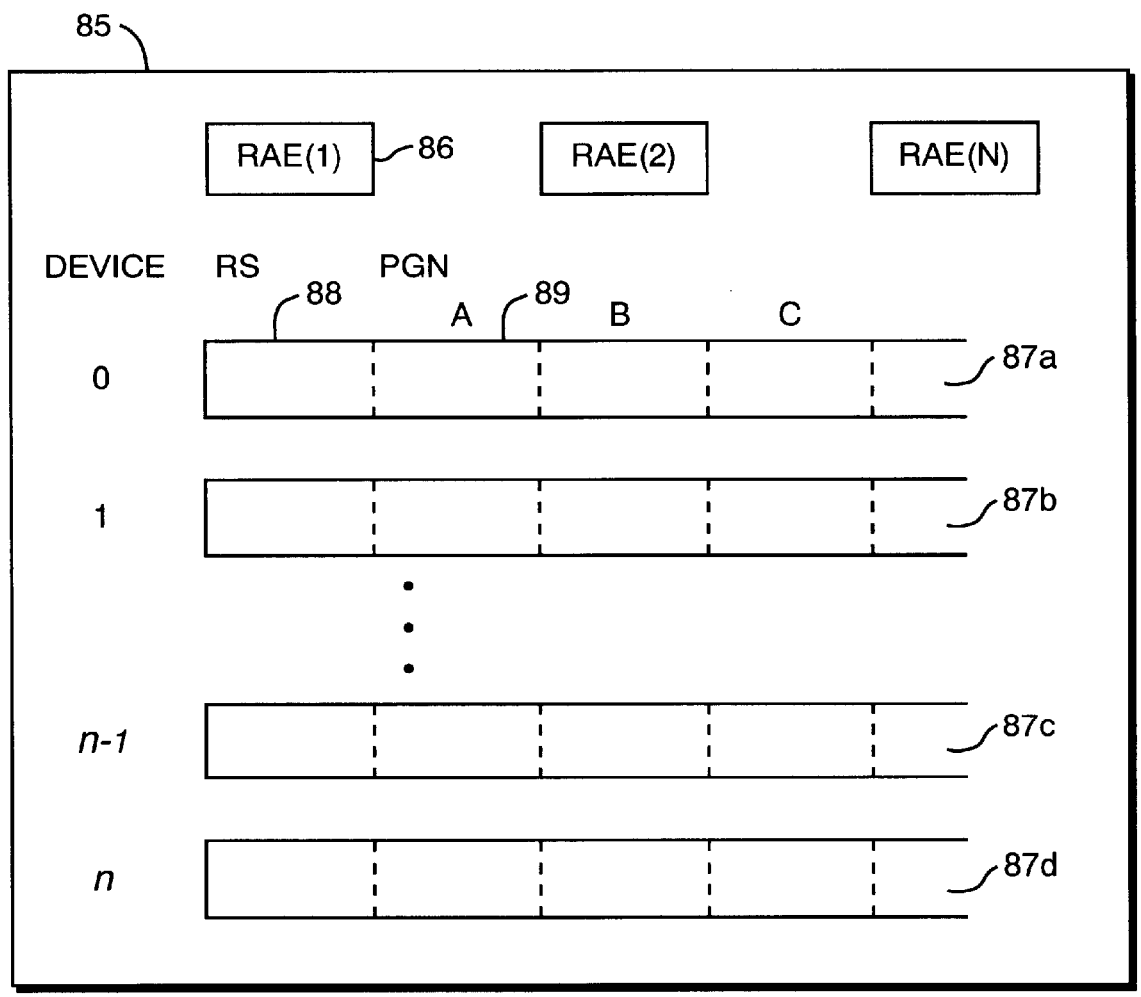
FIG. 8 depicts a status table useful in one embodiment of this invention.

Referring again to FIG. 1, each local storage controller includes a status table, such as a status table 85 in the local storage controller 22. FIG. 8 depicts elements of such a table that are important to an understanding of this invention. One or more RAE flags indicate whether any storage device attached to a corresponding remote adapter is in a consistency group. For example, the RAE(1) flag 86 indicates whether the remote adapter 50 in FIG. 1 was attached to a device in any consistency group. As shown in FIG. 8, there may be more than one RAE flag in a local storage controller. The "GROUP ENABLE" call identifies each remote adapter in a consistency group and uses the ENABLE module 72 in FIG. 5 to produce a conventional I/O request procedure modified to set the RAE(1) flag 86 for each such remote adapter. The DISABLE module uses an analogous procedure for clearing each RAE flag whenever none of the devices attached to a remote adapter is in any consistency group. This means the RAE flag associated with each remote adapter, such as the RAE flag 86 for remote adapter 50, when set, indicates that at least one device in communication with that remote adapter is in a consistency group that is enabled.

Still referring to FIG. 8, the status table 85 also contains information for each storage device in a remote storage controller with which the local storage controller communicates through any remote adapter. For example, a register is associated with each such device. These are designated as registers 87a through 87d for devices 0, 1, n−1 and n, respectively. As each has the same structure, only the register 87a associated with Device 0 is discussed in detail. Register 87a includes a remote status (RS) flag 88 and a series of path group notification (PGN) flags 89. The functions of these flags is described later.

Step 84 completes the operation of the INITIALIZE module 70. There is no further activity within the consistency group program until a communications path interruption is detected.

When a consistency group is enabled in step 84 of FIG. 6, unit check modules, such as unit check modules 90 and 91 in FIG. 1, are also enabled to monitor communications path status during each input/output request. Specifically the unit check module 90 will generate a unique code at any time it is determined that a one of the storage devices, such as any one of storage devices 57 and 59, will not be able to transfer data to the corresponding remote storage controller, such as remote storage controller 24, in response to a write request.

Figure 9:
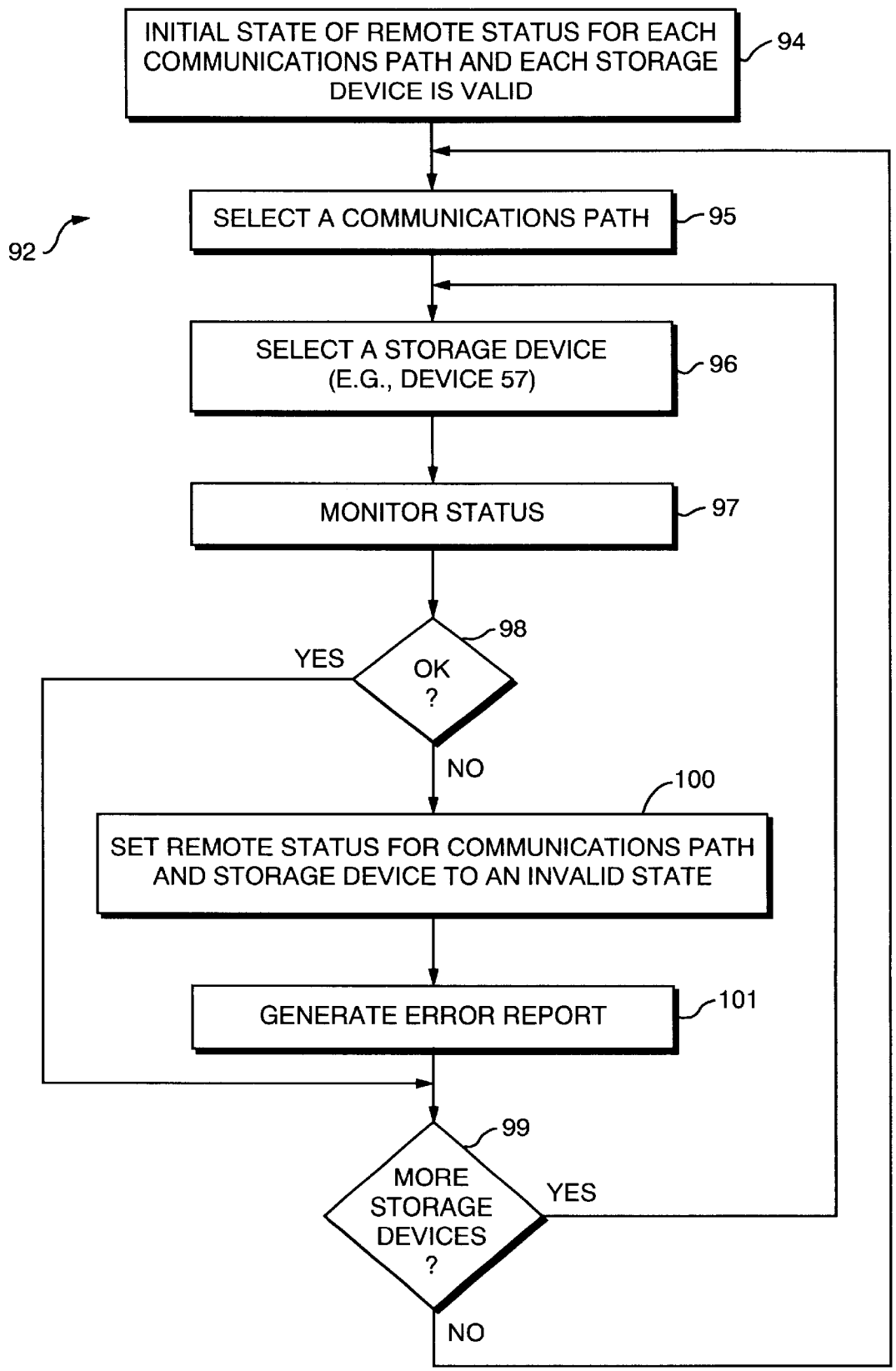
FIG. 9 is a flow diagram of a monitor module shown in FIG. 1.

For a better understanding of this invention, it will be helpful to discuss other features of this system particularly the method by which a monitor in each remote adapter, such as a monitor module 92 in remote adapter 50, maintains a current status in a remote status table, such as the remote status table 85 associated with the remote adapter 50. The module for maintaining the current status of the remote status table 85 is depicted in FIG. 9. This is a generally adopted approach used in storage controllers of the assigned of this invention.

Specifically, the operation of the monitor 92 as depicted in FIG. 9 assumes that, at step 94, the initial state of remote status (RS) flag for each communications path and each storage device connected to that communications path is valid. RS flags, such as the RS flag 88 in FIG. 8, reflect this state. Thus, the remote status table 85 will identify the validity of the combination of the path and a storage device, such as a storage device in the remote storage controller 24 attached to the remote adapter 50. The storage device may be represented as a physical storage device or a logical storage device (i.e., a logical volume) depending upon the particular configuration of the remote storage controller. In storage controllers provided by the assignee of this invention, logical volumes constitute logical storage devices. The phrase "storage device" is meant to cover all such definitions as may be pertinent to a particular implementation of the invention on a specific storage controller.

In FIG. 9 a monitor, such as monitor 92, operates iteratively using step 95 to select a communications path, such as communications paths 25 or 26 in FIG. 1. In step 96 the monitor 92 selects a storage device, such as a logical volume associated with one of the physical storage devices 57 or 59 attached to the selected communications path. In step 97 the monitor 92 performs various conventional tests that determine, among other things, whether the path to that particular storage device is valid and therefore whether it is likely that a request will be made successfully to that device.

As previously stated, there are a number of reasons why such a test would not produce a valid response. A particular storage device may have been removed for maintenance or be inoperative. The system operator may have turned off a series of storage devices for maintenance. All the communications links that constitute the path 25 may have been interrupted.

Whatever the reason, the monitor 92 makes that determination in step 97. If the status is satisfactory, step 98 branches to step 99 and no subsequent action is taken. If additional storage devices connected to the selected communications path must be tested, step 99 passes control to step 96; otherwise control passes to step 95.

If the step 97 determines that a particular communications path and storage device combination is not efficacious, step 98 branches to step 100. In this step the monitor changes the remote status flag for that specific communications path-storage device combination to an invalid state. Normally the system will then use step 101 to generate an error report to the system operator.

In essence, the procedure set forth in FIG. 9 constantly monitors the efficacy of the paths from a remote adapter, such as the remote adapter 50, to each of the storage devices (physical or logical) in the corresponding remote storage controller and maintains the status of each path and each communications path-storage device combination in the remote status table, such as the remote status table 85.

As previously stated, FIG. 9 depicts a continuing, repetitive, asynchronous process. It will be apparent that this process can be initiated in other ways. For example, the program may be operated asynchronously, but periodically in response to a timer signal. Alternatively the process might be initiated by the occurrence of an event, such as a system operator making a change in the local storage controller. In still other systems it might be appropriate to use some combination of the foregoing approaches or still some other approach that will cause a periodic test of the communications path and storage device to identify the inability of a remote storage device to receive data in an expeditious and timely fashion.

Figure 10:
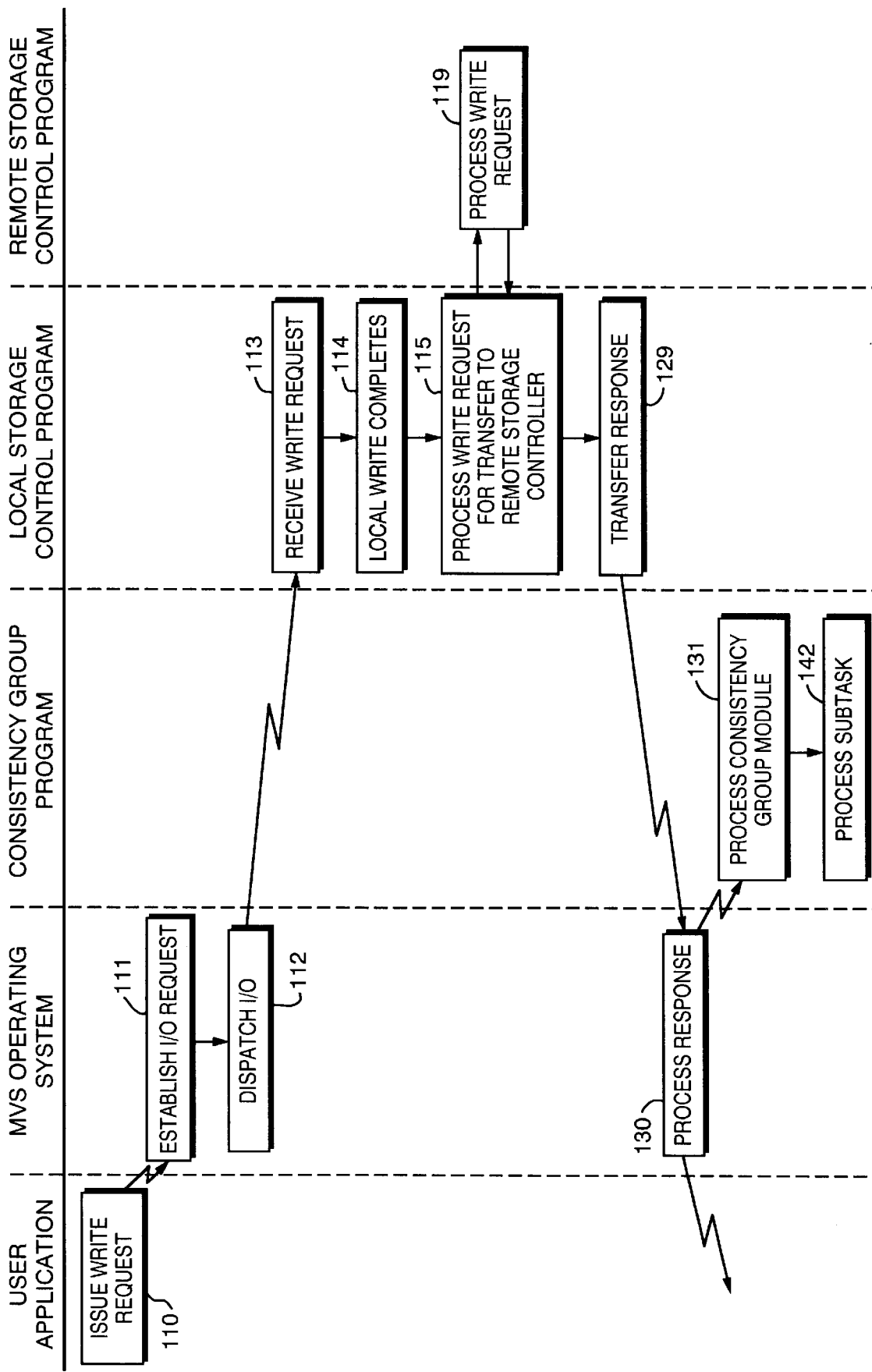
FIG. 10 is a chart depicting the general operation of this invention in the context of a specific digital computer operating system.

FIG. 10 depicts the manner in which the embodiment of FIGS. 1 and 4 through 7 operates in response to a communications path interruption after the consistency group program is enabled. A particular sequence begins when an application program, such as the APPL program 66 in FIG. 4, issues a write request shown at 110 in FIG. 9. The MVS operating system responds to that write request by establishing an I/O request at 111 and dispatching the I/O request at 112 according to conventional MVS operating procedures. The I/O request is directed to one of the local storage systems containing distributed dataset. At 113 in FIG. 10 the local storage controller receives the I/O request. For write I/O requests, the local storage controller completes a local write at step 114.

Figure 11:
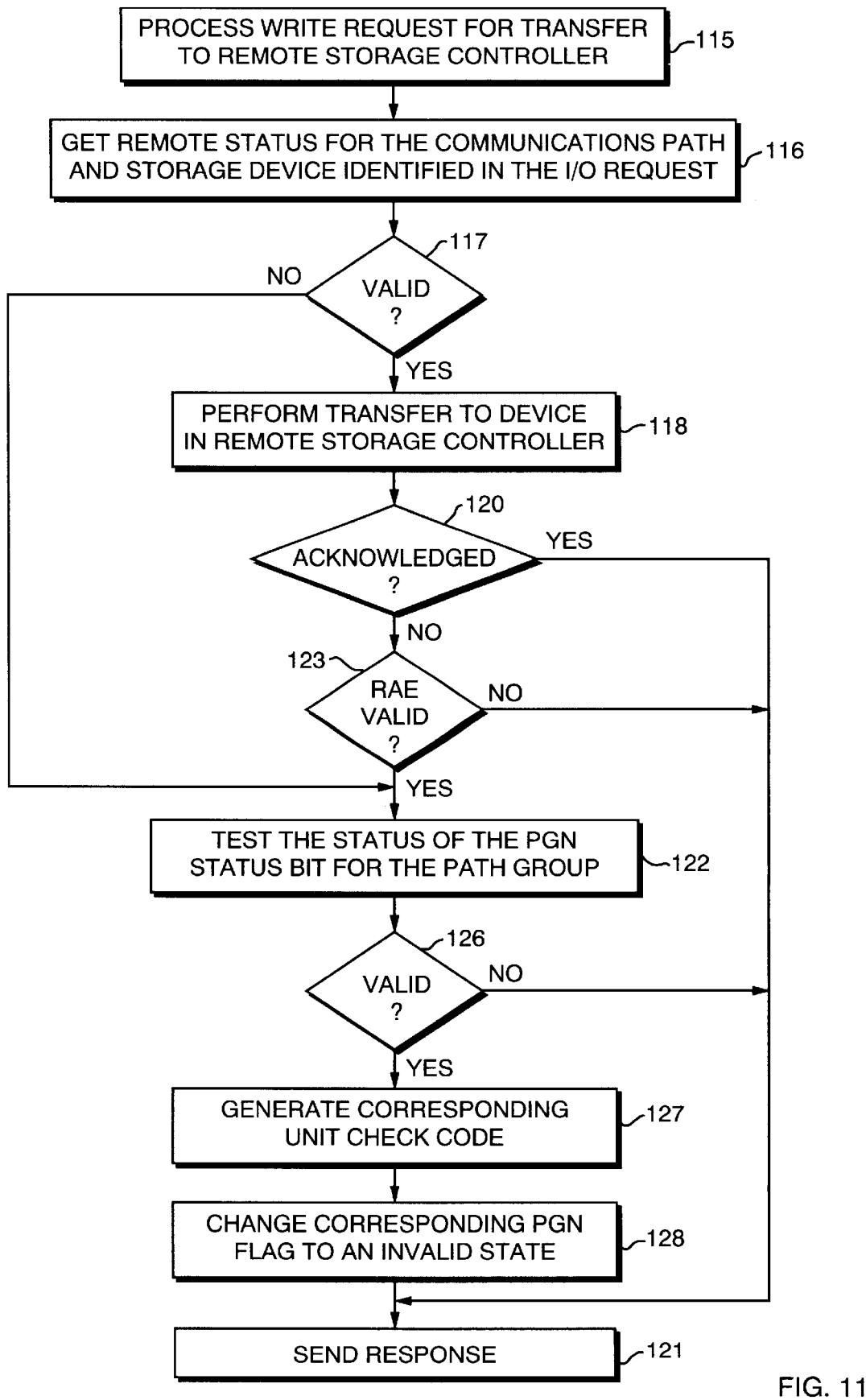
FIG. 11 is a flow diagram of a unit check module shown in FIGS. 1 and 10.

At 115 the local storage controller processes the write request for transfer to a designated remote storage controller. FIG. 11 depicts a module for performing this process. This module is replicated in each local storage controller. First, the module uses step 116 to retrieve the status (RS) flag for the device identified in the write request; e.g. the RS flag 88 if Device 0 is the addressed device. If the RS flag has a valid state, step 117 transfers control to step 118. In the context of FIG. 10, this represented as the step of enabling the transfer and the processing of that transfer at 119. The process at 119 ends with the generation of a response indicating the success or failure of the operation at the remote storage controller.

Referring again to FIG. 11, if a transfer is completed successfully, step 120 transfers control to step 121 thereby to transmit a response in the form of an acknowledgment signal back to indicate the successful completion of the writing operation.

If the RS flag for the addressed device is in an invalid state indicating that for some reason the write operation can not be completed over the communication path to the identified storage device, step 117 transfers control to step 122.

Likewise, if the response from the process 119 in FIG. 10 indicates the operation was not successful, step 120 transfers control to step 123 that tests the RAE flag in the status flags 85 for the remote adapter, such as the remote adapter 50, identified for transferring the data. As previously indicated, this indicates whether the remote adapter is even associated with any consistency group. If it is not, control transfers to step 121 to send an appropriate response in the form of an error signal indicating a failure of the write operation. If the RAE flag is in a valid state, however, control transfers to step 122.

Step 122 tests the state of the corresponding PGN status bit for the path group being utilized for the write request. In an MVS environment a path group represents multiple paths or links that interconnect a local host, such as the local host 20 in FIG. 1, to a local storage controller. As known and also shown in FIG. 1, multiple local hosts, such as local hosts 20 and 21, can connect to a single local storage controller, such as local storage controller 22. In the specific example of FIG. 1, the local storage controller has two path groups 124 and 125 from the local hosts 20 and 21 respectively.

Step 122 retrieves the corresponding PGN flag for the addressed device. For example, if the write operation is to Device 0 from local host 20, the PGN-A flag in the register 87A is the corresponding PGN flag. A valid state indicates that no interruptions have occurred in the transfers to the remote storage controllers.

If step 122 determines that the corresponding PGN status is at an invalid state, one independent path between the local and remote storage controllers has failed previously. There is no need to issue another unit check code, so control passes to step 121. If the corresponding PGN flag is at a valid state, this is a first failure in the path group. Step 126 thereupon transfers control to step 127 that generates a unique unit check code for transfer to the MVS operating system with the response of step 121. Then step 128 changes the corresponding PGN flag to an invalid state. If a subsequent write operation from the same local host is received, step 126 diverts control to step 121 immediately so redundant generation of the unique unit check code is avoided.

As will be apparent, although the transfer of a response in step 121 has been shown in a single step, the exact nature of the response will depend upon the method of entry to step 121; that is, whether the entry to step 121 is from step 120, 123, 126 or 128.

Still referring to FIG. 10, at 129 the local storage controller transfers the response to the MVS operating system and the MVS operating system begins to process the response in a conventional manner at 130.

Figure 12:
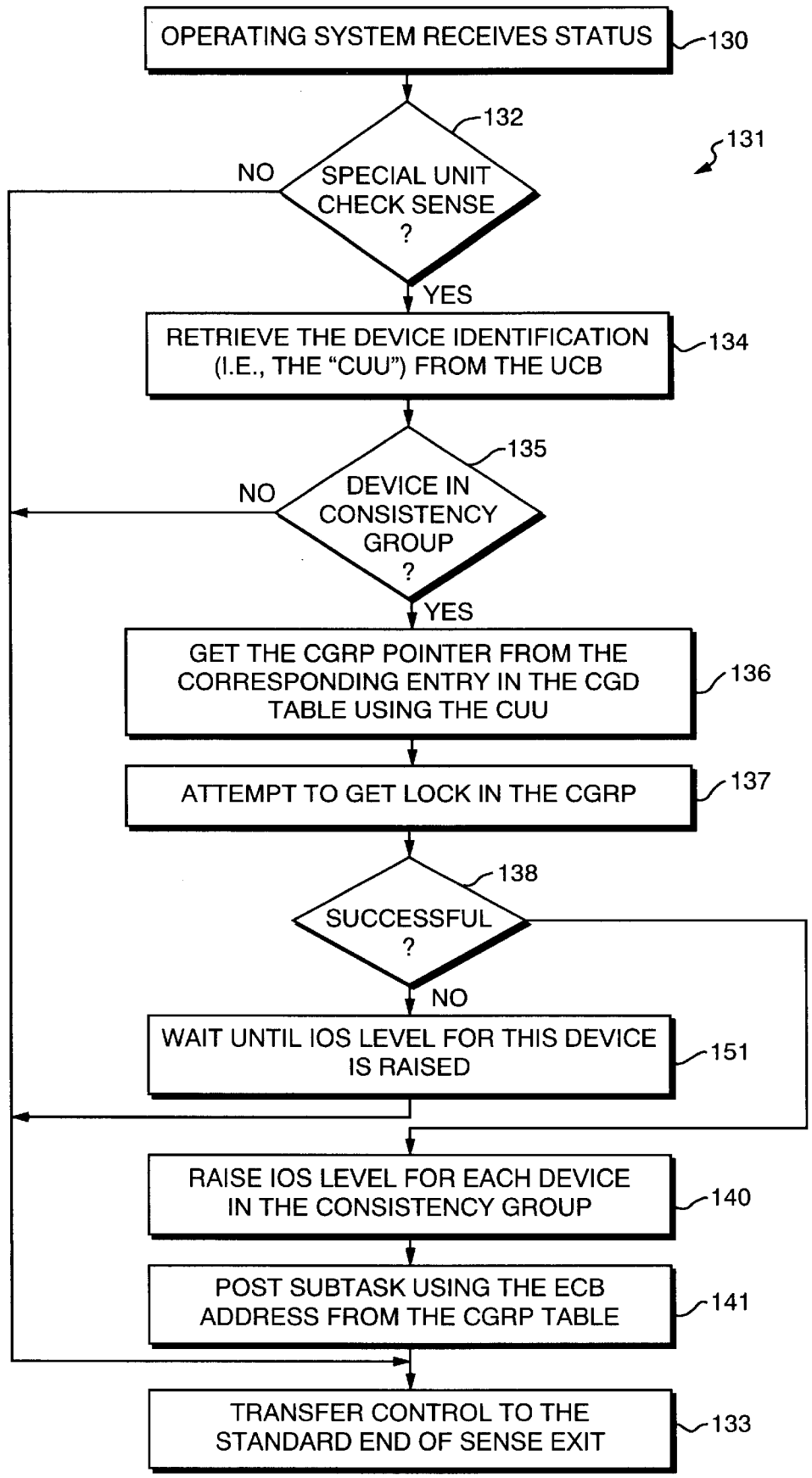
FIG. 12 is a flow diagram of a module that responds to the receipt of a unit check sense from the module of FIG. 10.

However, as will be recalled, the INITIALIZE module of FIG. 6 has modified the MVS operating system to intercept these responses and transfer control to 131 in FIG. 10 to process the response in the consistency group module. FIG. 12 depicts the receipt of a response at 130 and transfer to the consistency group module 131 to monitor the acknowledgment signal to determine the presence of a special unit check sense at step 132. If no such special unit check sense is included, control transfers to step 133 to process the acknowledgement signal and transfer control back to the MVS standard end of sense exit.

If the special unit check sense is received, control passes to step 134 that begins the suspend process. In step 134 the process retrieves the device identification from the UCB. If this device is not in a consistency group, step 135 transfers control to step 133 to allow conventional processing of the end of sense exit by the operating system. Otherwise control passes to step 136. The process uses this CUU to gain access to the appropriate consistency group through the control blocks 71 in FIG. 7 in step 136.

Next step 137 attempts to obtain a lock to serialize operations. If that process is successful, step 137 transfers control to step 140 whereupon the EMC EOS exit routine 130 raises the IOS level for each device in the consistency group. Raising the IOS level for each device in the consistency group assures normal I/O requests directed to a device can not be processed so long as the IOS level for that device is raised.

The subtask posted in step 141 is designed to cause a suspension of any further write operations to devices in the consistency group in the remote storage controllers. Thus, the subtask as posted will contain a list of all the devices obtained from the control blocks 71. When the subtask is posted, the transfer of step 133 is made to the MVS end of sense exit.

Figure 13:
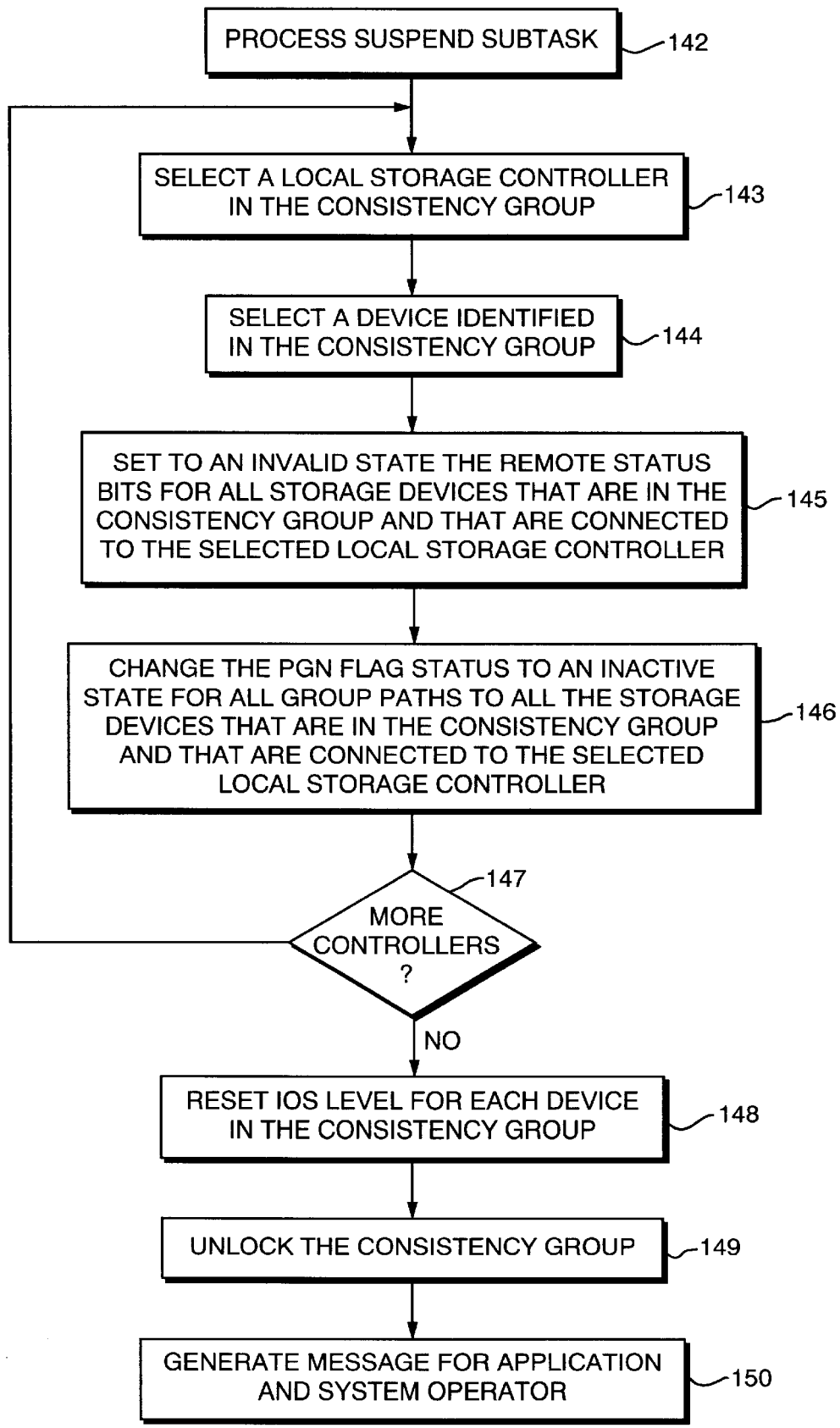
FIG. 13 depicts the operation of a module that suspends operations to storage devices.

FIG. 13 depicts the operation of the subtask posted at step 141 represented in FIG. 10 at 142. As will be apparent from FIG. 12, when this process begins it operates at the raised IOS level. Step 143 selects a local storage controller. Step 144 then selects a device in the consistency group to provide a basis for issuing the I/O request that will suspend transfers. This I/O request, depicted in step 145 sets the remote status (RS) flag for each storage device in the selected local storage controller and consistency group to an invalid state. That is, for the selected local storage controller, the RS flag, such as RS flag 88 associated with Device 0 is set to an invalid state.

Step 146 then sets to an inactive state all the PGN flags, such as the PGN flags in register 87A for Device 0, for all the storage devices in the selected local storage controller and in the consistency group. Step 147 then transfers control back to step 143 if other local storage controllers exist.

When the RS flags and PGN flags associated with all the storage controllers in the consistency group have been set to an invalid state, step 147 transfers control to step 148 to reset the IOS level for each device in the consistency group. Step 147 then unlocks the consistency group, and step 150 represents a procedure by which a message may be generated for transfer to the application, the system operator or both.

The foregoing procedures cooperate to maintain consistency under a wide variety of conditions. For example, if a single write operation causes suspension, a later write operation from the same MVS system will be prevented from reaching a remote storage controller because the RS flag and corresponding PGN flags will be set to an inactive state.

As another example, assume that multiple MVS systems can access a single consistency group over multiple path groups. Further assume that a write operation from a first MVS system has produced the specific unit check code. As previously indicated, step 146 in FIG. 13 has set all the PGN flags to an inactive state for all the devices. Now assume a second MVS system issues a write operation to another device. When the module of FIG. 11 processes that module, the tests at steps 117 and 126 will fail. Consequently, the module will not send a redundant unit check code.

Another possibility occurs if a second MVS systems issues a write request to another device over another path group with an invalid RS flag that is processed after the unit check code is generated in step 127 of FIG. 11 and the suspension produced by steps 145 and 146 in FIG. 13. In that situation control passes from step 117 in FIG. 11 to step 122 and from step 126 to step 127 because the PGN flag for that path will still be valid. Although this produces a redundant operation under normal conditions, it assures that the suspension occurs even if, for some reason, the response to the first write operation fails to suspend transfers to all the devices in the consistency group.

Conversely, the PGN flags prevent repeated unit check code processing in the operating system in other situations. If two paths should fail, only the first to fail will interrupt the operating system. The second will merely produce a response that will free the local write operation for completion if it occurs after steps 144 and 146 in FIG. 3 are processed in response to the first failure.

If two write requests issue unit check codes essentially simultaneously, the locking process of FIG. 12 serializes the operations. As previously indicated, the successful lock produces the suspension. As unsuccessful lock merely waits in step 151 of FIG. 12 until the IOS level is raised. It then merely transfers an acknowledgment to the operating system so the I/O request can be completed at the local storage controller.

After the transfers to all the remote storage controllers in a group have been suspended, the local hosts continue to operate with the local storage controllers without interruption. However, no additional transfers occur with respect to the remote storage controller for the devices in the consistency group. Thus, even though synchronism is lost between a remote and local storage controller, the data in the remote storage controller remains unchanged and fixed in time, so it is consistent.

When the cause of the condition that interrupted the transfers is overcome, the system operator utilizes the console device 65 in FIG. 4 to run the resume module 75. The resume module performs two functions. First, it eliminates the suspension mode utilizing a similar process to that performed by the suspension module by resetting all the relevant RS and PGN flags to a valid state. In the specific embodiment of storage controllers as used by the assignee of this invention, the local storage controllers have identified all the data that has been modified since the suspension and not transferred to the remote storage controllers. Consequently, the resume module additionally enables a remote copy program to make those transfers and update all the data in the local remote storage controllers independently of the local or remote hosts. When the data is updated, synchronism is restored and the consistency operation may be enabled.

Thus, in accordance with several objects of this invention, there has been disclosed a method and apparatus for maintaining consistency of data organized to be distributed across multiple storage controllers connected to provide redundant copies over independent paths. When the transmission of data over any one path is interrupted, all subsequent transfers to the redundant copy are inhibited. Operations continue between the application program and the local storage controllers so that this sequence of events is transparent to the application and does not interrupt operations with the local copy of the data. As will be apparent, the consistency module is particularly useful in monitoring single write operations and dependent write operations that are common to operations involving databases.

This invention has been described in terms of a particular embodiment. FIGS. 1 through 3 depict specific configurations of local and remote hosts and local and remote storage controllers; the balance specific implementations. It will be apparent that a number of variations can be made. Each of those figures additionally discloses a maximum plurality of two local or two remote storage controllers. Data may be distributed over more than two storage controllers. The foregoing description assumes that a single device can only be included in one consistency group. It will be apparent that modifications could be made to enable a single device (CUU) to be included in multiple consistency groups. The remote storage controllers typically will be physically removed from the local storage controllers. However, they may also be collocated with the local storage controllers. Even more modifications can be made to the disclosed apparatus without departing from the invention. Therefore, it is the intent of the appended claims to cover all such variations and modifications as come within the true spirit and scope of this invention.

What is claimed as new and desired to be secured by Letters Patent of the United States is:

1. A method for maintaining consistency between first and second redundant dataset copies wherein programs processed by a host interact with the first dataset copy, wherein at least one of first and second redundant data set copies is stored on a plurality of separate magnetic disk storage systems and wherein transfers of data from the first data set copy to the second data set copy occur over multiple independent communication paths between said plurality of separate magnetic disk storage systems storing the redundant data set copies, said method comprising the steps of:

A) determining independently of and asynchronously to interactions between the host and first data set copy the efficacy of transfers from the first data set copy to the second data set copy over each independent communication path to the second data set copy, B) terminating all transfers from the first data set copy to the second data set copy over all the independent paths in response to a determination that a transfer over any one of the independent communications paths is not efficacious whereby the entirety of the second data set copy thereafter remains unchanged, C) continuing operations between the host and the first data set copy during said termination, and D) reestablishing transfers to the second data set copy over all the independent communications paths after restoring the operation of any non-efficacious communications path.

2. A method as recited in claim 1 wherein each of the first and second data set copies is stored on a plurality of separate magnetic disk storage systems, the determination that a transfer is not efficacious to one of the plurality of separate magnetic disk storage systems storing the second data set copy terminating all transfers from all the magnetic disk storage systems storing the first data set copy to all the separate magnetic disk storage systems storing the second data set copy.

3. A method as recited in claim 1 wherein the first data set copy is stored on a single magnetic disk storage system and the second data set copy is stored on a plurality of separate magnetic disk storage systems, the determination that a transfer is not efficacious to one of the plurality of separate magnetic disk storage systems storing the second data set copy terminating all transfers from the single magnetic disk storage system storing the first data set copy to all the separate magnetic disk storage systems storing the second data set copy.

4. A method as recited in claim 1 wherein the first data set copy is stored on a plurality of separate magnetic disk storage systems and the second data set copy is stored on a single magnetic disk storage systems, the determination that a transfer is not efficacious from any of the plurality of separate magnetic disk storage systems storing the first data set copy to the magnetic disk storage system storing the second data set copy terminating all transfers from all the magnetic disk storage systems storing the first data set copy to the magnetic disk storage system storing the second data set copy.

5. A method as recited in claim 1 wherein said determination of efficacy includes performing a check on the operation of an independent communications path and generating a code indicating the efficacy of the path and wherein during said termination the host processes a unit check indicating the non-efficacy of the communications path by executing, at an elevated priority, a procedure for suspending transfers to the second data set copy over all the corresponding communications paths.

6. A method as recited in claim 5 wherein the host requesting a transfer receives an acknowledgement of a transfer notwithstanding the efficacy of the independent communications paths.

7. A method wherein a multi-user operating system controls transfers between a host and a first data set stored in a local storage facility, wherein a remote storage facility stores a copy of the data set that is updated over a plurality of independent communications paths, and wherein at least one of the local and remote storage facilities includes a plurality of separate magnetic disk storage systems, said method comprising the steps of responding to a write operation to the local storage facility comprising:

A) checking the efficacy of the corresponding path for conveying the data defined by the write operation to the remote storage facility.

B) responding to a predetermined code generated by said checking step indicating that a transfer over the corresponding communications path can not be made, C) enabling the operating system to respond to the predetermined code by identifying each magnetic disk storage system in the local storage facility that contains the data set, D) precluding responses to normal requests by the operating system, E) initiating a procedure for suspending communications from the corresponding magnetic disk storage systems that contain the data set to the remote storage facility over all the communications paths, and F) lowering the priority of level of operations for the operating system after said initiation thereby to enable further operations between the host and the first data set while communications with the remote storage facility are suspended.

8. A method as recited in claim 7 wherein said precluding step includes obtaining a lock on the operating system for each magnetic disk storage system in the local storage facility storing the first data set and releasing the lock after the priority level is lowered.

9. A method as recited in claim 7 wherein each magnetic disk storage system comprises a plurality of storage devices and said method is operable after an initiation procedure and said identification of the magnetic disk storage systems includes:

i) establishing a table accessible by the operating system that defines all magnetic disk storage systems and storage devices that contain the first data set, ii) generating with said checking step an identity of the storage device, iii) generating in the operating system a subtask for suspending operations that identifies each storage device that contain the first data set.

10. A method as recited in claim 9 wherein the operating system at the local storage facility acknowledges the completion of each write operation thereto notwithstanding the efficacy of the transfers to the remote storage facility.

11. Data processing apparatus for maintaining consistency between first and second redundant data set copies wherein programs processed by a host interact with the first data set copy, wherein at least one of first and second redundant data set copies is stored on a plurality of separate magnetic disk storage systems and wherein data transfers to the second data set copy occur over multiple independent communication paths between said plurality of separate magnetic disk storage systems storing the redundant data set copies, said apparatus comprising:

A) means for determining independently of and asynchronously to transfers between the host and the local storage facility the efficacy of transfers from the first data set copy to the second data set copy over each independent communication path to the second data set copy, B) means for terminating all transfers from the first data set copy to the second data set copy over all the independent paths in response to a determination that a transfer over any one of the independent communications paths is not efficacious whereby the entirety of the second data set copy thereafter remains unchanged, operations between the host and the first data set copy continuing during the termination established by said termination means, and C) means for reestablishing transfers to the second data set copy over all the independent communications paths after all communications paths are determined to be efficacious.

12. Apparatus as recited in claim 11 wherein each of the first and second data set copies is stored on a plurality of separate magnetic disk storage systems, said determining means responding to a state wherein a transfer is not efficacious to one of the plurality of magnetic disk storage systems storing the second data set copy causing said terminating means to suspend all transfers from all the separate magnetic disk storage systems storing the first data set copy to all the separate magnetic disk storage systems storing the second data set copy.

13. Apparatus as recited in claim 11 wherein the first data set copy is stored on a single magnetic disk storage system and the second data set copy is stored on a plurality of separate magnetic disk storage systems, said determining means responding to a state wherein a transfer is not efficacious to one of the plurality of separate magnetic disk storage systems storing the second data set; copy causing said terminating means to suspend all transfers from the single magnetic disk storage system storing the first data set copy to all the separate magnetic disk storage systems storing the second data set: copy.

14. Apparatus as recited in claim 11 wherein the first data set copy is stored on a plurality of separate magnetic disk storage systems and the second data set copy is stored on a single magnetic disk storage system, said determining means responding to a state wherein a transfer is not efficacious from any of the plurality of separate magnetic disk storage systems storing the first data set copy to the magnetic disk storage system storing the second data set copy causing said terminating means to suspend all transfers from all the magnetic disk storage systems storing the first data set copy to the magnetic disk storage system storing the second data set copy.

15. Apparatus as recited in claim 11 wherein said determining means includes unit check means for performing a check on the operation of an independent communications path and generating a code indicating the efficacy of the path and wherein said termination means includes means for executing, at an elevated priority, a procedure for suspending transfers to the second data set copy over all the corresponding communications paths.

16. Apparatus as recited in claim 15 additionally comprising means for generating an acknowledgement of a transfer notwithstanding the efficacy of the independent communications paths.

17. Data processing apparatus wherein a multi-user operating system controls transfers between a host and a first data set stored in a local storage facility and wherein a remote storage facility stores a copy of the data set that is updated over a plurality of independent communications paths, said apparatus comprising:

A) unit check means responsive to a write operation for checking the efficacy of the corresponding path for conveying the data defined by the write operation to the remote storage facility, B) means for responding to a predetermined code generated by said unit check means indicating that eL transfer over the corresponding communications path can not be made, C) means for enabling the operating system to respond to the predetermined code by identifying each magnetic disk storage system in the local storage facility that contains the data set, D) means for precluding the response of the operating system to normal I/O requests, and E) means for suspending communications from the corresponding magnetic disk storage systems that contain the data set to the remote storage facility over all the communications paths, said priority control means thereafter lowering the priority of level of operations for the operating system thereby to enable further operations between the host and the first data set while communications with the remote storage facility are suspended.

18. Apparatus as recited in claim 17 wherein said precluding means includes means for obtaining a lock on the operating system for each magnetic disk storage system in the local storage facility storing the first data set and releasing the lock after the priority level is lowered.

19. Apparatus as recited in claim 17 wherein each magnetic disk storage system comprises a plurality of storage devices and said unit check means includes means for identifying a particular storage device, said apparatus additionally comprising:

i) a table accessible by the operating system that defines all the magnetic disk storage systems and storage devices that contain the first data set, and ii) means for generating an operating system subtask for suspending operations that identifies each storage device that contains the first data set.

20. Apparatus as recited in claim 19 additionally comprising means at the local storage facility for acknowledging to the host the completion of each write operation thereto notwithstanding the efficacy of the transfers to the remote storage facility.

* * * * *